(12) United States Patent
Williams et al.

(10) Patent No.: US 9,140,301 B1
(45) Date of Patent: Sep. 22, 2015

(54) MACHINE GUIDEWAYS

(71) Applicant: PHD, Inc., Fort Wayne, IN (US)

(72) Inventors: Matthew R. Williams, Fort Wayne, IN (US); Lyle A. Null, Markle, IN (US)

(73) Assignee: PHD, INC, Fort Wayne, IN (US)

( * ) Notice: Subject to any disclaimer, the term of this patent is extended or adjusted under 35 U.S.C. 154(b) by 0 days.

(21) Appl. No.: 14/254,162

(22) Filed: Apr. 16, 2014

(51) Int. Cl.
*F16C 29/04* (2006.01)
*F16C 29/12* (2006.01)
*F16C 29/00* (2006.01)

(52) U.S. Cl.
CPC ................. *F16C 29/12* (2013.01); *F16C 29/00* (2013.01)

(58) Field of Classification Search
CPC ...................................................... F16C 29/045
See application file for complete search history.

(56) References Cited

U.S. PATENT DOCUMENTS

| | | | | |
|---|---|---|---|---|
| 4,204,719 A | * | 5/1980 | Murphy | 384/546 |
| 6,648,508 B1 | * | 11/2003 | Brunk et al. | 384/57 |
| 2009/0268993 A1 | * | 10/2009 | Tsai | 384/7 |
| 2009/0285513 A1 | * | 11/2009 | Schroeder | 384/50 |

* cited by examiner

*Primary Examiner* — Thomas R. Hannon
(74) *Attorney, Agent, or Firm* — Taylor IP, P.C.

(57) ABSTRACT

The present invention provides a machine guideway including a base, a shaft placed in a groove within the base, a carriage slidably connected to the base and shaft, a pair of opposed wheels held by the carriage, and a cover placed over the pair of opposed wheels. The groove has an arch shape defining a groove arch radius. The shaft defines a shaft radius less than the groove arch radius. Each opposed wheel of the pair of opposed wheels contacts the shaft at a rolling point and has a plurality of radii. The plurality of radii of each opposed wheel together form a pair arch when the opposed wheels are held by the carriage. The pair arch defines a pair arch radius that is greater than the shaft radius. The cover is configured to keep the pair of opposed wheels in contact with the shaft with a pre-loaded force.

20 Claims, 5 Drawing Sheets

MACHINE GUIDEWAYS

BACKGROUND OF THE INVENTION

1. Field of the Invention

The present invention relates to machine guideways.

2. Description of the Related Art

Machine guideways (also referred to as linear guideways) find wide use in the construction of machine tools and other machines and mechanisms where constituent components of the machine must be precisely moved and positioned along a pre-determined path. It is often desirable for these guideways to provide large load carrying capacity and maximum rigidity while possessing minimum moving friction, physical size, and cost. However, increasing the load capacity and the rigidity typically has the undesirable effect of increasing the moving friction, the physical size, or the cost of the resulting guideway.

What is needed in the art is a machine guideway capable of carrying a large load with lowered friction, size or cost.

SUMMARY OF THE INVENTION

The present invention provides a machine guideway that includes a pair of opposed wheels contacting a shaft with a pre-loaded force provided by a cover.

The invention in one form is directed to a machine guideway including a base, a shaft placed within a groove formed in the base, a carriage slidably connected to the base and shaft, at least one pair of opposed wheels held by the carriage, and a cover at least partially covering the pair of opposed wheels. The groove formed in the base has an arch shape that defines a groove arch radius. The shaft placed in the groove defines a shaft radius that is less than the groove arch radius. Each wheel of the at least one pair of opposed wheels contacts the shaft at a rolling point and has a plurality of radii. The plurality of radii of each opposed wheel together form a pair arch when the at least one pair of opposed wheels are held by the carriage and define a pair arch radius that is greater than the shaft radius. The cover is configured to keep the opposed wheels of the at least one pair of opposed wheels in contact with the shaft with a pre-loaded force.

The invention in another form is directed to a machine guideway that includes a base, a first shaft placed within a first groove of the base, a second shaft placed within a second groove of the base, a carriage placed in a gap between the first groove and second groove and slidably connected to the base, first shaft and second shaft, a first pair of opposed wheels held by the carriage adjacent to the first shaft, a second pair of opposed wheels held by the carriage adjacent to the second shaft, and at least one cover at least partially covering the first pair of opposed wheels and second pair of opposed wheels. The first groove of the base has a first arch shape defining a first groove arch radius and the second groove of the base has a second arch shape defining a second groove arch radius. The first shaft defines a first shaft radius that is less than the first groove arch radius and the second shaft defines a second shaft radius that is less than the second groove arch radius. Each wheel of the first pair of opposed wheels contacts the first shaft at a first rolling point and has a first plurality of radii. The first plurality of radii of each opposed wheel of the first pair of opposed wheels together form a first pair arch defining a first pair arch radius that is greater than the first shaft radius when the first pair of opposed wheels are held by the carriage. Each wheel of the second pair of opposed wheels contacts the second shaft at a second rolling point and has a second plurality of radii. The second plurality of radii of each opposed wheel of the second pair of opposed wheels together form a second pair arch defining a second pair arch radius that is greater than the second shaft radius when the second pair of opposed wheels are held by the carriage. The cover is configured to keep the first pair of opposed wheels in contact with the first shaft with a first pre-loaded force and/or the second pair of opposed wheels in contact with the second shaft with a second pre-loaded force.

An advantage of the present invention is that it allows for a large load carrying capacity with lowered friction, size or cost.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
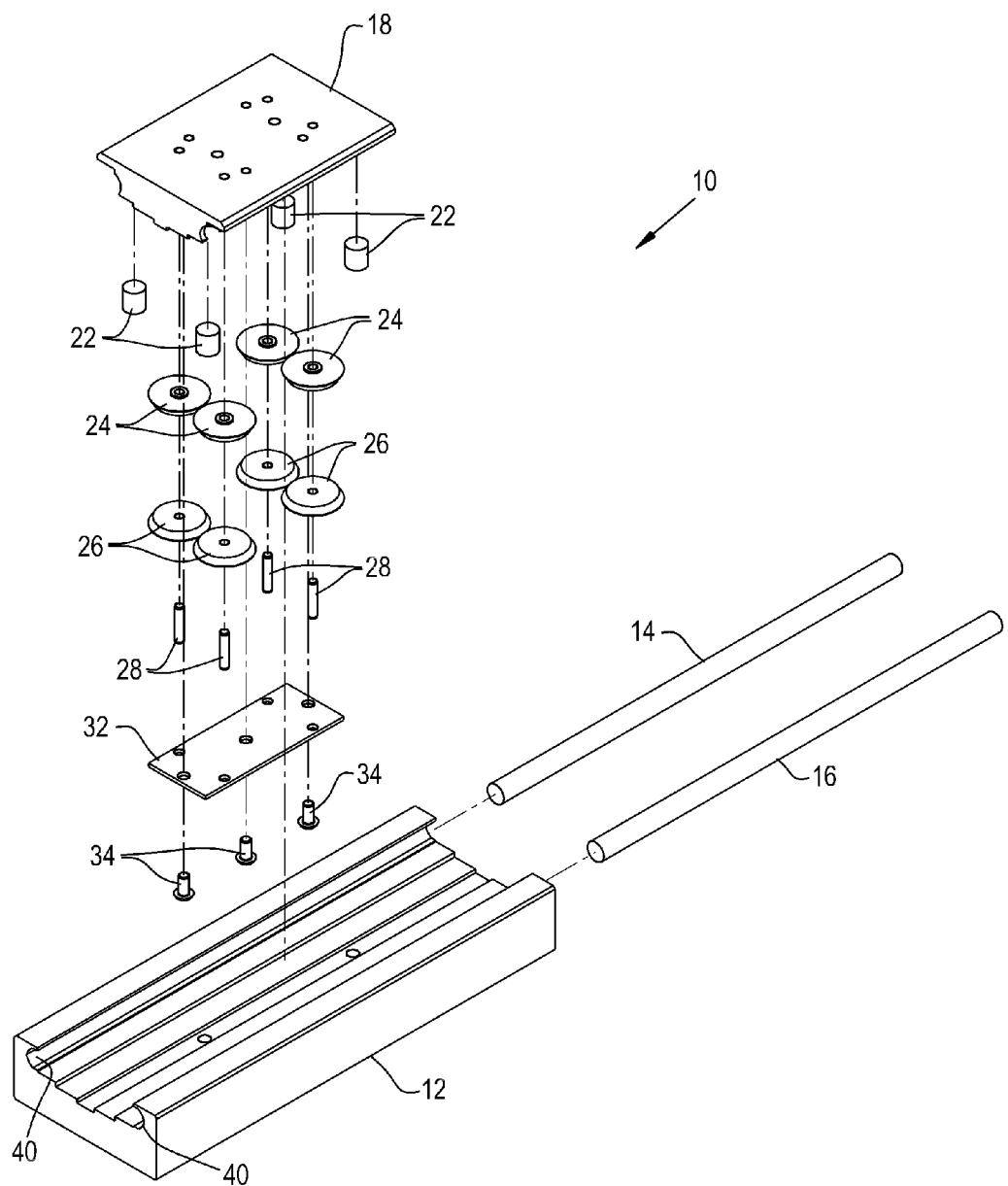
FIG. 1 is an exploded view of an embodiment of a guideway of the present invention.
Figure 2:
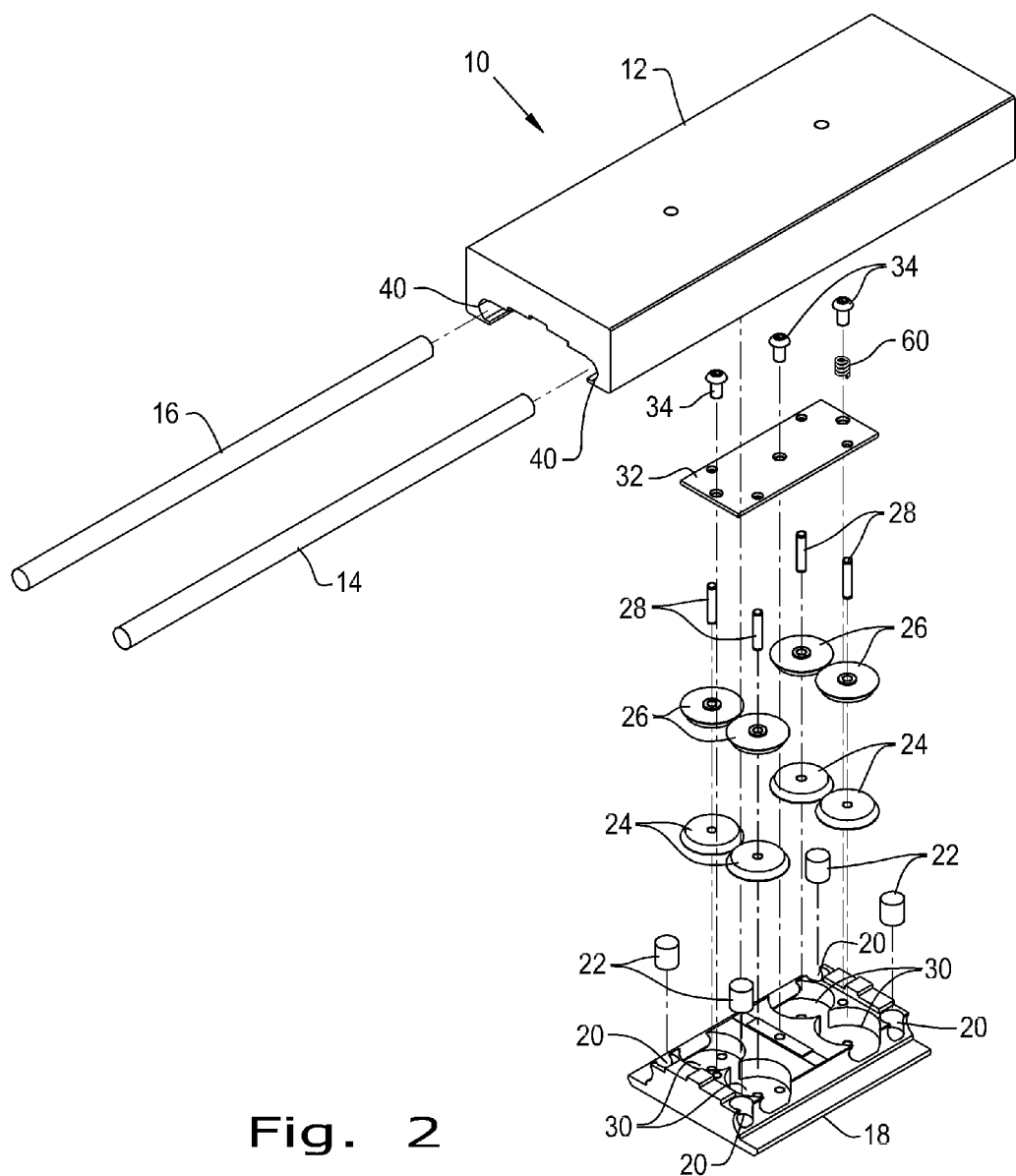
FIG. 2 is another exploded view of the guideway shown in FIG. 1.

Referring now to the drawings, and more particularly to FIGS. 1 and 2, there is shown a guideway 10, including a base 12, shafts 14, 16 held in the base 12, and a carriage 18 slidably connected to the base 12 and shafts 14, 16. The base 12 can be statically mounted and constructed from a relatively soft metal, such as an aluminum alloy, or a polymer that can be economically formed into long, continuous lengths with a dimensionally controlled cross-section by extrusion. Shafts 14, 16 held in the base can be constructed from a relatively hard and wear resistant metal, such as heat-treated steel alloy, to form a running surface for a plurality of rotating elements (wheels) to contact and slide along.

Figure 3:
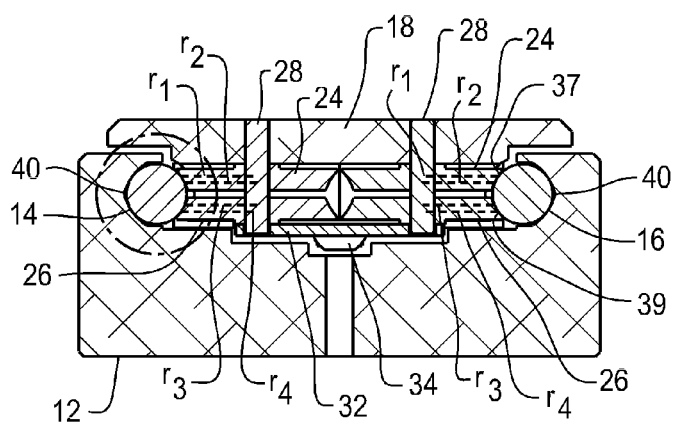
FIG. 3 is a cross-sectional view of the guideway shown in FIGS. 1 and 2.

A carriage 18 is slidably connected to base 12 and shafts 14, 16 and has openings 20 formed within that contain lubricating wicks 22. Wicks 22 are ideally constructed from a felt or open cell foam and are impregnated with a suitable oil or grease so as to lubricate contacting surfaces and wipe away particulates during operation of the guideway 10. Upper wheels 24 and lower wheels 26 are held by carriage 18 and rotate freely about pins 28. Pins 28 can be retained into carriage 18 by a press-fit or other suitable means. The pairs of opposing wheels 24, 26 are positioned on the carriage 18 in contact with shafts 14, 16 so as to the engage the shafts 14, 16 and allow unencumbered parallel movement along the longitudinal axis of the shafts 14, 16 and base 12, while precluding orthogonal movement relative to the shafts 14, 16. Wheels 24 and 26 are free to translate along the longitudinal axis of pin 28 and can be held within complimentary cavities 30 within carriage 18 by a slidable cover 32. Threaded fasteners 34 can engage mating threads in carriage 18 and pull cover 32 against lower wheels 26 when fasteners 34 are tightened. The number and distribution of fasteners 34 affixed to cover 32 and carriage 18 can be altered to adjust the forces that will be preloaded to components of the guideway 10. The radii r1, r2, r3, r4 of wheels 24 and 26 (see FIG. 3) form contacting surfaces 36, 37, 38, 39 that adjoin the cylindrical diameter of shafts 14, 16, forming a "gothic arch" that encloses each shaft 14, 16. Shafts 14, 16 are captivated in similar gothic arches formed by radii r5 of grooves 40 in the walls of base 12, which will be further discussed. It is appreciated that the longitudinal length of shafts 14, 16 and base 12 can be chosen to affect a desired distance of carriage travel without changing the substance of the invention. Radii r1, r2, r3, r4 in wheels 24 and 26 are chosen to create contacting surfaces 36 and 38 and contacting surfaces 37 and 39.

Figure 4:
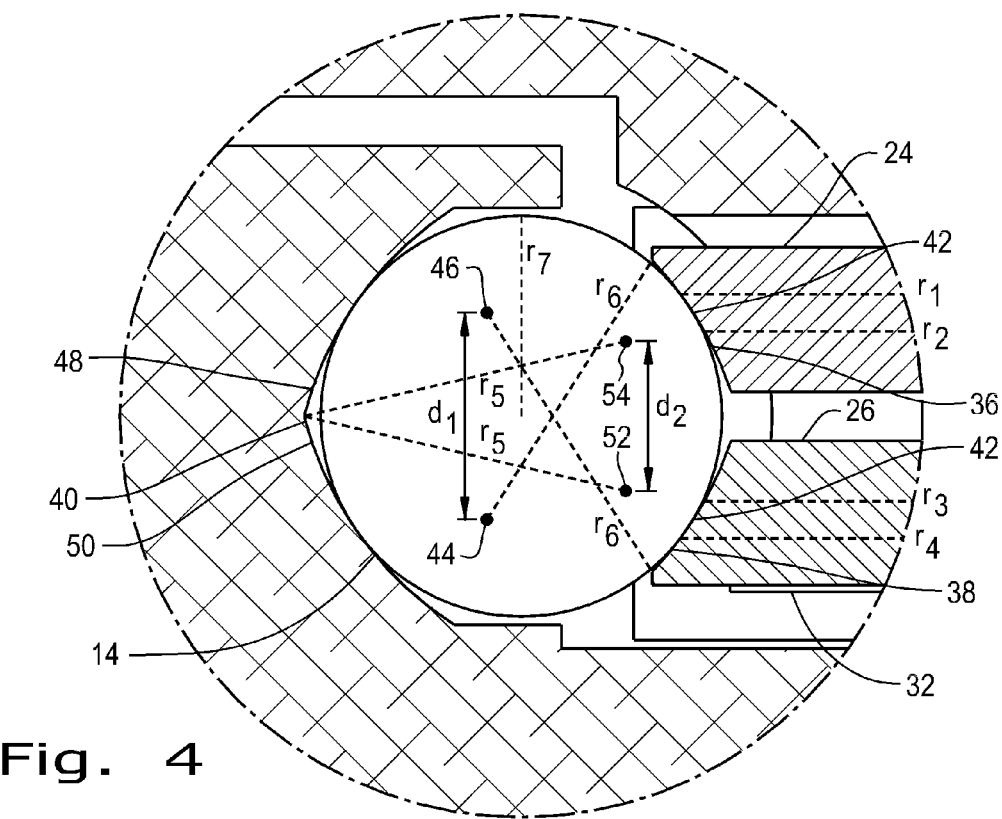
FIG. 4 is another cross-sectional view of the guideway shown in FIGS. 1, 2 and 3.

As can be seen in FIG. 4, each contacting surface 36, 38 has an arced shape that is defined by respective centers 44, 46 with a radius r6 and a vertical displacement d1 between the two centers 44 and 46, forming the gothic arch shape. Radius r6 is larger than a radius r7 of shafts 14, 16 in order to create a single rolling point 42 of contact between each wheel and the shaft upon which the wheel rolls. This single rolling point 42 of contact minimizes sliding between the surface of the contacting wheel and the shaft, thereby reducing wear of the wheel and shaft. The larger radii r6 also promote centering of each pair of upper wheels 24 and lower wheels 26 about each shaft 14, 16. While each contacting surface 36, 38 is shown as having an arced shape defined by equal radii r6, the radii r6 defining each contacting surface 36, 38 can be altered to be different, if desired. In an analogous manner, the grooves 40 of base 12 have a first arch side 48 and a second arch side 50 that together form a gothic arch. The first arch side 48 and second arch side 50 each have an arced shape defined by respective centers 52, 54 with radius r5 and a vertical displacement d2 between the centers 52 and 54. The radii r5 of the first arch side 48 and second arch side 50 are larger than radius r7 of shafts 14, 16 so as to promote centering of the shafts 14, 16 within the formed gothic arch. Although the illustrated embodiment chooses radii r5 for the first arch side 48 and second arch side 50 that are equal, the radii r5 to the centers 52, 54 can be altered if desired. Likewise, wheels 24 and 26 may employ shaft contacting radii r1, r2, r3, r4, which form contacting surfaces 36, 37, 38, 39, that differ in value between the two wheels. Although the guideway 10 is shown with four pairs of wheels 24 and 26 and two shafts 14 and 16, the present invention can be modified to include as many pairs of wheels 24 and 26 and shafts as desired.

Figure 5A:
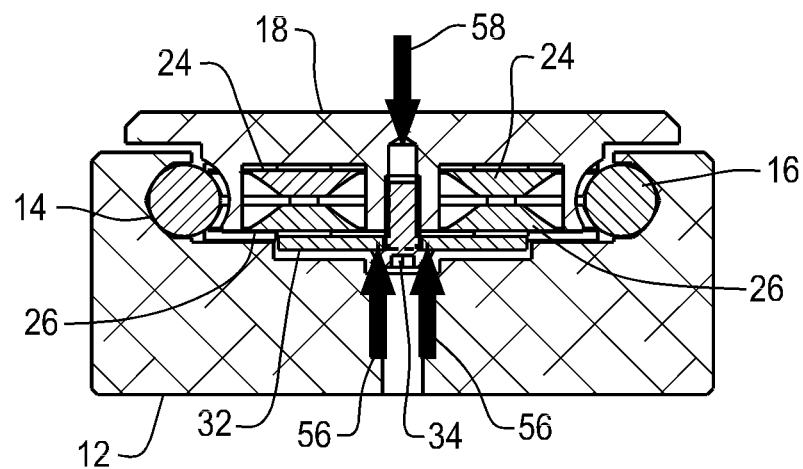
FIGS. 5A-D are cross-sectional views illustrating the progression of preload forces through a guideway of the present invention.
Figure 5B:
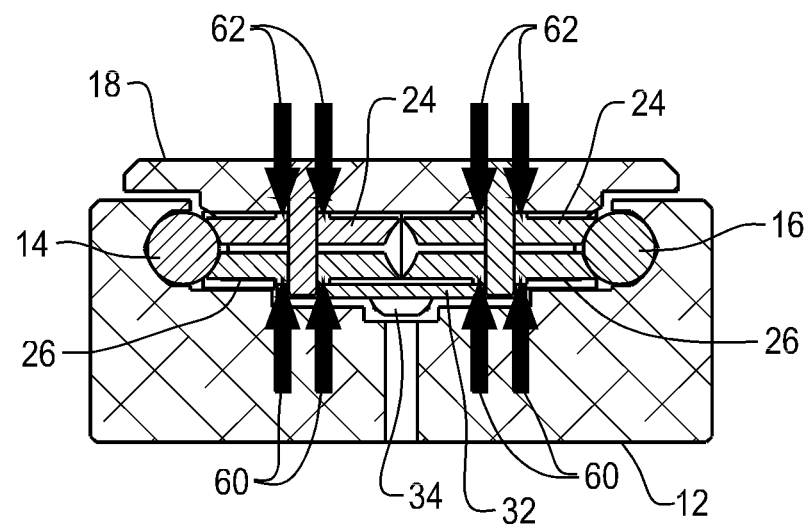
Figure 5C:
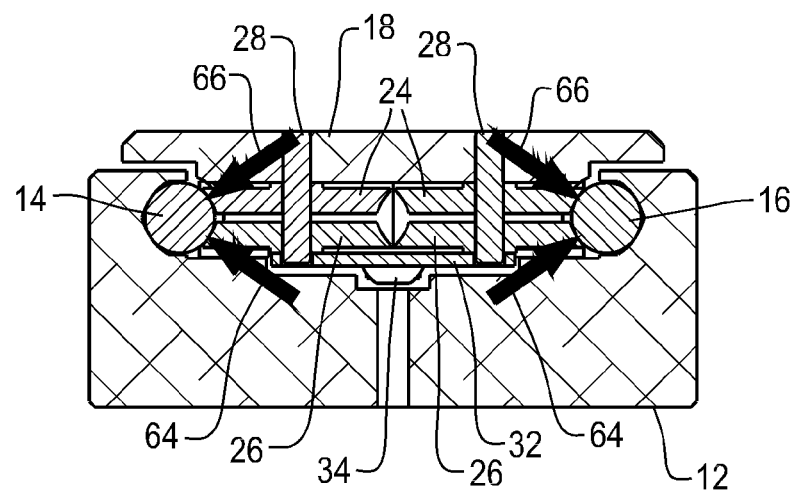
Figure 5D:
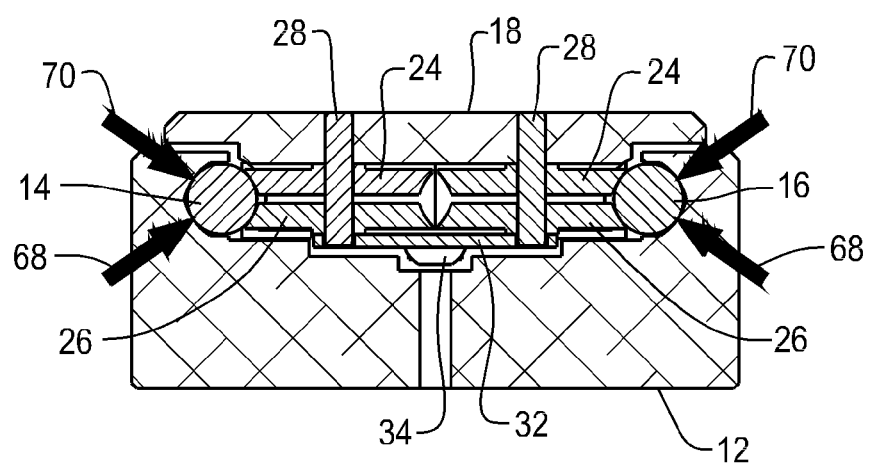

FIGS. 5A-5D illustrate the progression of preload forces through the guideway 10 mechanism. Forces 56 are generated by the heads of threaded fasteners 34 against cover 32 to move the cover 32 upwards, in the direction of forces 56, as the fasteners 34 are threaded into complimentary bores in carriage 18. Reaction force 58 simultaneously arises in carriage 18 and acts to move the carriage 18 downward, in the direction of force 58 (see FIG. 5A). In turn, cover 32 applies forces 60 against the bottoms of lower wheels 26, pushing the wheels 26 upward toward shafts 14, 16. Simultaneously, forces 62 are applied by carriage 18 against the tops of upper wheels 24, to move the wheels 24 downward toward shafts 14, 16 (see FIG. 5B). In FIG. 5C, lower wheels 26 have moved into physical contact with shafts 14, 16 and forces 64 are created between the wheels 26 and shafts 14, 16 to move shafts 14, 16 outward, toward the gothic arches present in the walls of base 12. In a similar manner, upper wheels 24 have moved into physical contact with shafts 14, 16 and forces 66 are created between the wheels 24 and shafts 14, 16 which also act to move shafts 14, 16 outward, toward the gothic arches present in the walls of base 12. In FIG. 5D, shafts 14, 16 have moved into physical contact with the gothic arches present in the walls of base 12 and forces 68 and 70 are created which balance forces 64 and 66 to center shafts 14, 16 within radii r5 that form the gothic arches in base 12 (see also FIGS. 3 and 4). In this manner, tightening fastener 34 removes physical clearance between the components comprising the guideway 10 that would otherwise reduce the precision and positioning repeatability of the guideway 10. Additionally, tightening fastener 34 provides a beneficial preload between the components comprising the guideway 10 to desirably increase the stiffness of the guideway 10.

In another embodiment, suitable springs 60, e.g., coined disk, wave, or helical, can be disposed between cover 32 and the head(s) of one or more fasteners 34. The force exerted by the spring(s) 60 is chosen to control the magnitude of the preload forces and the spring rate (stiffness) of the spring(s) 60 is chosen to allow for sufficient travel of the cover 32 to compensate for any anticipated movement of the constituent guideway components that may occur due to wear during the service life of the guideway 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A machine guideway, comprising:
   a base having a groove formed therein, said groove having an arch shape defining a groove arch radius;
   a shaft placed within said groove, said shaft defining a shaft radius that is less than said groove arch radius;
   a carriage slidably connected to said base and said shaft;
   at least one pair of opposed wheels held by said carriage, each opposed wheel of said at least one pair of opposed wheels contacting said shaft at a rolling point and having a plurality of radii, said plurality of radii of each opposed wheel together forming a pair arch when said at least one pair of opposed wheels are held by said carriage, said pair arch defining a pair arch radius that is greater than said shaft radius; and
   a cover at least partially placed over said at least one pair of opposed wheels configured to keep said at least one pair of opposed wheels in contact with said shaft with a pre-loaded force.

2. The machine guideway according to claim 1, wherein each of said at least one pair of opposed wheels includes an opening formed therethrough defining a pivot point.

3. The machine guideway according to claim 2, further including a pin placed within said pivot point of said at least one pair of opposed wheels.

4. The machine guideway according to claim 3, further including a fastener connecting said cover to said carriage and configured to provide said pre-loaded force to said at least one pair of opposed wheels and said shaft.

5. The machine guideway according to claim 4, wherein said carriage has at least one wick opening formed adjacent to said shaft.

6. The machine guideway according to claim 5, further including a lubricating wick placed within said at least one wick opening and contacting said shaft.

7. The machine guideway according to claim 6, wherein said carriage includes a plurality of said pair of opposed wheels and said plurality of said pair of opposed wheels are at least partially covered by said cover or a plurality of said covers.

8. The machine guideway according to claim 7, wherein one of said plurality of said pair of opposed wheels is placed adjacent to another one of said plurality of said pair of opposed wheels along a length of said shaft.

9. The machine guideway according to claim 6, wherein said groove and said pair arch are shaped as gothic arches.

10. The machine guideway according to claim 6, wherein said carriage includes a cavity holding said at least one pair of opposed wheels.

11. A machine guideway, comprising:
a base having a first groove and a second groove formed therein with a gap between said first groove and said second groove, said first groove having a first arch shape defining a first groove arch radius and said second groove having a second arch shape defining a second groove arch radius;
a first shaft placed within said first groove, said first shaft defining a first shaft radius that is less than said first groove arch radius;
a second shaft placed within said second groove, said second shaft defining a second shaft radius that is less than said second groove arch radius;
a carriage placed in said gap and slidably connected to said base, said first shaft and said second shaft;
a first pair of opposed wheels held by said carriage adjacent to said first shaft, each opposed wheel of said first pair of opposed wheels contacting said first shaft at a first rolling point and having a first plurality of radii, said first plurality of radii of each opposed wheel of said first pair of opposed wheels together forming a first pair arch when said first pair of opposed wheels are held by said carriage, said first pair arch defining a first pair arch radius that is greater than said first shaft radius;
a second pair of opposed wheels held by said carriage adjacent to said second shaft, each opposed wheel of said second pair of opposed wheels contacting said second shaft at a second rolling point and having a second plurality of radii, said second plurality of radii of each opposed wheel of said second pair of opposed wheels together forming a second pair arch when said second pair of opposed wheels are held by said carriage, said second pair arch defining a second pair arch radius that is greater than said second shaft radius; and
at least one cover at least partially placed over said first pair of opposed wheels and said second pair of opposed wheels configured to keep at least one of said first pair of opposed wheels in contact with said first shaft with a first pre-loaded force and said second pair of opposed wheels in contact with said second shaft with a second pre-loaded force.

12. The machine guideway according to claim 11, wherein said first pre-loaded force and said second pre-loaded force are equal.

13. The machine guideway according to claim 11, wherein each opposed wheel of said first pair of opposed wheels have an opening formed therethrough defining a first pivot point and each opposed wheel of said second pair of opposed wheels have an opening formed therethrough defining a second pivot point.

14. The machine guideway according to claim 13, further including a first pin connecting said first pair of opposed wheels to said carriage through said first pivot point and a second pin connecting said second pair of opposed wheels to said carriage through said second pivot point.

15. The machine guideway according to claim 14, wherein at least one of said first groove arch, said second groove arch, said first pair arch and said second pair arch is a gothic arch.

16. The machine guideway according to claim 15, further including a fastener connecting said at least one cover to said carriage and configured to provide at least one of said first pre-loaded force and said second pre-loaded force.

17. The machine guideway according to claim 16, wherein said carriage includes at least one wick opening formed adjacent to at least one of said first shaft and said second shaft.

18. The machine guideway according to claim 17, further including a lubricating wick placed in said at least one wick opening.

19. The machine guideway according to claim 18, wherein said carriage includes at least one of a first cavity holding said first pair of opposed wheels and a second cavity holding said second pair of opposed wheels.

20. The machine guideway according to claim 16, further including a spring placed between said fastener and said cover.

* * * * *